Patented Feb. 17, 1942

2,273,141

UNITED STATES PATENT OFFICE 2,273,141

PRODUCTION OF AMINES OF THE ACETYLENE SERIES

Walter Reppe, Ernst Keyssner, and Otto Hecht, Ludwigshafen-on-the-Rhine, Germany, assignors, by mesne assignments, to General Aniline & Film Corporation, New York, N. Y., a corporation of Delaware No Drawing. Application July 1, 1938, Serial No. 216,962. In Germany July 28, 1937

3 Claims. (Cl. 260—583)

The present invention relates to amino compounds of the acetylene series and a process of producing same.

We have found that amino compounds of the acetylene series, i. e. amino compounds having triple unsaturated carbon linkages can be obtained in a manner which is simple industrially by treating methylolamino compounds with acetylene in the presence of catalysts. Suitable methylol amino compounds are those obtainable by condensing aldehydes or ketones with amino compounds, e. g. dimethylol urea or methylolisobutylamine, especially such methylol compounds containing exclusively tertiary basic nitrogen atoms as are obtained by condensing aldehydes or ketones with secondary amines or heterocyclic secondary bases, as for example dimethylamine, diethylamine, dibutylamine, diisobutylamine, diethanol amines, N-alkylanilines, N-alkylnaphthylamines, dicyclohexylamine, piperidine, or morpholine and also dimethylol urea.

Suitable catalysts are the heavy metals of the first and second groups of the periodic system and their compounds, in particular copper and its salts, as for example copper chloride or cuprous chloride, copper acetate, copper formate or acetylene-copper compounds. It is often preferable to use either basic compounds, such as ammonia or amines or ammonium or amine salts, alkali or alkaline earth salts during the condensation or to carry out the process in a weakly acid medium. The process may be carried out in the presence or absence of solvents, as for example water or organic solvents miscible with water, such as alcohols, dioxane or low molecular fatty acids. The temperatures depend on the substance used; the condensation often takes place even at ordinary or slightly elevated temperature. Generally speaking, the temperatures necessary for the reaction do not exceed about 120° C. It may be carried out at atmospheric pressure, and also under increased pressure, for example at pressures between 2 and 40 atmospheres. Highly concentrated acetylene or acetylene diluted with any foreign gases may be used, as for example electric arc acetylene.

The condensation according to this invention proceeds with the splitting off of water and the adding on of the acetylene radicle to the carbon atom of the methylol compound. The condensation may take place with one or with both of the hydrogen atoms of the acetylene. The condensation products obtained are, by reason of their triple unsaturated carbon linkage, especially reactive and may be subjected to polymerization, either directly or after conversion of the triple unsaturated linkage into a double linkage, resinous substances thus being obtained. They are also valuable initial materials for the preparation of solvents, pharmaceuticals and dyestuffs. Thus the resulting acetylene derivatives still containing a hydrogen atom in the acetylene radicle yield, for example with alcohols in the presence of strongly alkaline substances, vinyl ethers which in turn are readily convertible into carbonyl compounds by the splitting off of the alcohol radicle and rearrangement.

The following examples will further illustrate how this invention may be carried out in practice but the invention is not restricted to these examples. The parts are by weight.

*Example 1*

822 parts of glacial acetic acid are added to 450 parts of 50 per cent aqueous dimethylamine while stirring and cooling between 10° and 20° C. The resulting solution is charged with a solution of 40 parts of copper acetate in 972 parts of 40 per cent formaldehyde into a pressure-tight boiler. 5 atmospheres of nitrogen and 10 atmospheres of acetylene are pressed in consecutively and the whole stirred at 40° C. until no further decrease in pressure takes place. The acetylene used up is replenished by pressing in fresh acetylene from time to time. After from 10 to 20 hours, the absorption of acetylene is completed. For each molecular proportion of the dimethylmethylol amine used, 1 molecular proportion (in all about 280 parts) of acetylene is absorbed. The reaction mixture is freed by filtration from the deposited acetylene-copper compound and there is added to the clear, pale red-brown filtrate an amount of 47.6 per cent caustic soda solution corresponding to the amount of glacial acetic acid used while stirring and cooling; two layers are thus formed. After separating the upper layer which consists of a concentrated, about 70 percent, aqueous solution of the reaction product, the lower aqueous salt solution is exhaustively shaken with ether. The ether is evaporated from the ether extract and the residue combined with the separated upper layer. The aqueous reaction product is dried with solid caustic potash and then subjected to fractionation. In addition to a small amount of first runnings and a residue, there is thus obtained a main fraction of an amine boiling between 79° and 80° C. and having the constitution:

(N-dimethyl-propargylamine)

in a yield of about 70 per cent. There is also formed in a small amount (about 10 per cent) as a by-product, tetramethyldiamino-dimethylacetylene of the formula:

$(CH_3)_2N.CH_2.C \equiv C.CH_2N(CH_3)_2$ (boiling point 180° C.).

If a corresponding amount of isobutylamine be used as initial material instead of the dimethylamine, N-isobutyl-propargylamine having a boiling point of from 134° to 136° C. is obtained in a good yield.

Example 2

567 parts of formic acid are added to 225 parts of 50 per cent aqueous dimethylamine while stirring and cooling at from 10° to 20° C. 360 parts of butyraldehyde and 10 parts of copper chloride are then added. The resulting solution is treated at 40° C. with a mixture of acetylene and nitrogen in the manner described in Example 1. The absorption of acetylene is completed in about 8 hours. The reaction product is worked up as described in Example 1. The alpha-propyl-alpha-N-dimethyl-propargylamine of the formula:

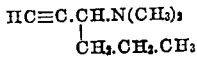

thus formed in a good yield boils at from 134° to 136° C.

Small amounts of the corresponding dialkylated acetylene are formed as a by-product.

Example 3

252 parts of glacial acetic acid and 10 parts of cuprous chloride are added to 516 parts of di-butylamine while stirring and cooling at from 10° to 20° C. After adding 300 parts of 40 per cent formaldehyde, the mixture is treated at from 30° to 40° C. in a pressure-tight vessel with a mixture of acetylene and nitrogen as described in Example 1. 1 molecular proportion of acetylene is absorbed for each molecular proportion of amine. The reaction product consisting of two layers is freed by filtration from acetylene copper compound and neutralized with caustic soda solution. The two layers are then separated from each other. The upper layer, consisting of almost pure propargyl-di-normal-butyl)-amine of the formula:

$HC \equiv C.CH_2N(C_4H_9)_2$ is dried with solid potassium hydroxide and then fractionally distilled; there are obtained a yield of 80 per cent of propargyl-(di-normal-butyl)-amine having a boiling point of from 87° to 89° C. at 19 millimeters (mercury gauge) and a yield of about 10 per cent of tetra-normal-butyl-di-amino-dimethylacetylene of the constitution:

$(C_4H_9)_2N.CH_2.C \equiv C.CH_2.N(C_4H_9)_2$ having a boiling point of from 133° to 135° C. at 1 millimeter (mercury gauge).

Example 4

1370 parts of 98 per cent formic acid and 10 parts of cuprous chloride are added to 500 parts of 50 per cent aqueous dimethylamine while stirring and cooling. 225 parts of 98 per cent acetaldehyde are added to the resulting solution which is then treated in a stirring autoclave at from 25° to 30° C. with a mixture of 10 atmospheres of acetylene and 5 atmospheres of nitrogen until no further absorption of acetylene takes place. By working up in the manner described in Example 1 there is obtained in a good yield alpha-methyl-N-dimethyl-propargylamine of the constitution:

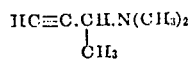

in addition to small amounts of the corresponding dialkylated acetylene.

Example 5

A solution prepared at from 10° to 20° C., of 225 parts of 100 per cent dimethylamine, 330 parts of glacial acetic acid and 10 parts of cuprous chloride has added to it 530 parts of benzaldehyde, the whole then being treated with a mixture of 5 atmospheres of nitrogen and 10 atmospheres of acetylene in a stirring autoclave for about 30 hours at about 40° C. 1 molecular proportion of acetylene is absorbed for each molecular proportion of amine used. The reaction product consisting of two layers is worked up in a similar manner to that described in Example 3.

There is obtained a yield of about 70 per cent of alpha-phenyl-alpha-N-dimethyl-propargylamine of the constitution:

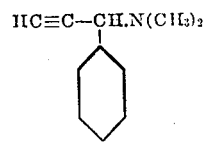

having a boiling point of 69° C. at 1 millimeter (mercury gauge) and also a small amount of the disubstituted acetylene.

Example 6

36.5 parts of diethylamine and 2.5 parts of cuprous chloride which have previously been mixed with an equal amount of kieselguhr by powerful shaking are added in a pressure-tight vessel to a mixture of 33 parts of glacial acetic acid and 50 parts of 30 per cent formaldehyde while cooling. A mixture of 1 part of nitrogen and 2 parts of acetylene is then pressed in at 40° C. under 15 atmospheres pressure and the acetylene used up is replaced until the pressure no longer decreases. About 12 parts of acetylene are necessary for saturation.

The reaction product is freed from catalyst by filtration and then rendered alkaline with caustic soda solution and extracted with ether several times. The combined ether extracts are dried with sodium hydroxide and distilled. After removing the ether, the N-diethyl-propargylamine formed passes over at 120° C. as a colorless liquid.

Example 7

A mixture of 290 parts of acetone, 20 parts of absolute alcohol in which 1 part of metallic sodium has been dissolved, 250 parts of 100 per cent dimethylamine and 10 parts of cuprous chloride is treated with acetylene in a stirring autoclave at about 80° C. in the manner described in Example 1 until acetylene is no longer absorbed. After cooling and degasifying the dissolved acetylene and distilling off unchanged acetone and dimethylamine, there is obtained in a good yield the N-dimethyl-alpha-dimethylpropargylamine of the constitution:

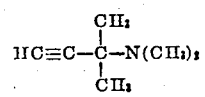

The new compound melts at from 97° to 98° C., complete sublimation already taking place.

Example 8

22.5 parts of dimethylamine and an intimate mixture of 2 parts of cuprous chloride, 0.02 part of silver nitrate and 2 parts of kieselguhr (as catalyst) are introduced into a mixture of 33 parts of glacial acetic acid and 50 parts of 30 per cent formaldehyde in a pressure-tight vessel while cooling. The whole is treated at room temperature with a mixture of 10 atmospheres of acetylene and 5 atmospheres of nitrogen. After 7 hours, 13.5 parts of acetylene have been absorbed. The dimethyl-propargylamine formed is set free by the addition of caustic soda solution. It is extracted with ether, dried with caustic potash and then distilled.

Example 9

302 parts of dimethylolurea (obtainable for example in the manner described in U. S. Patent No. 1,989,628), 1280 parts of methanol and 7 parts of cuprous chloride are treated in a pressure-tight vessel at from about 20° to 30° C. with a mixture of equal parts of nitrogen and acetylene under a pressure of 20 atmospheres. After from about 20 to 24 hours, 1 molecular proportion of acetylene has been absorbed, and the reaction is completed. The reaction mixture is filtered and the methanol distilled off from the filtrate at from about 30° to 50° C. under a pressure of from 25 to 50 millimeters (mercury gauge). There are thus obtained from 270 to 300 parts of highly elastic resin which may be dissolved for example in ethylene glycol monomethyl ether or monoethyl ether. After evaporation of the solvent, a hard insoluble product is obtained after about 1½ days.

The monomeric compound first obtained is probably N-hydroxymethyl-N'-omega-propine-urea.

What we claim is:

1. A process for the production of tertiary amino compounds of the acetylene series which comprises treating with acetylene at temperatures between 25 and 120° C. and at pressures between atmospheric pressure and 40 atmospheres teritary methylol amines derived from secondary amines selected from the group consisting of saturated aliphatic, alicyclic, saturated monocyclic heterocyclic, and alkyl-aryl amines and wherein the methylol group is attached to the nitrogen atom of the amino group in the presence of a catalyst selected from the group consisting of acetylides and salts of heavy metals of the first and second group of the periodic system.

2. A process for the production of tertiary amino compounds of the acetylene series which comprises treating with acetylene at temperatures between 25 and 120° C. and at pressures between atmospheric pressure and 40 atmospheres tertiary methylol amines derived from secondary amines selected from the group consisting of saturated aliphatic, alicyclic, saturated monocyclic heterocyclic, and alkyl-aryl amines and wherein the methylol group is attached to the nitrogen atom of the amino group in the presence of a catalyst selected from the group consisting of acetylides and salts of copper.

3. A process for the production of tertiary amino compounds of the acetylene series which comprises treating with acetylene at temperatures between 25 and 120° C. and at pressures between atmospheric pressure and 40 atmospheres tertiary methylol amines of the aliphatic series wherein the methylol group is attached to the nitrogen atom of the amino group in the presence of a catalyst selected from the group consisting of acetylides and salts of copper.

WALTER REPPE.
ERNST KEYSSNER.
OTTO HECHT.